United States Patent [19]

O'Connell et al.

[11] Patent Number: 4,463,039

[45] Date of Patent: Jul. 31, 1984

[54] SPRAYABLE ACOUSTICAL COMPOSITION

[75] Inventors: Daniel D. O'Connell, Crystal Lake, Ill.; Thomas A. Broz, Willoughby, Ohio

[73] Assignee: United States Gypsum Company, Chicago, Ill.

[21] Appl. No.: 503,071

[22] Filed: Jun. 13, 1983

Related U.S. Application Data

[63] Continuation-in-part of Ser. No. 337,546, Jan. 6, 1982, abandoned.

[51] Int. Cl.$^3$ .......................... B05D 1/02; B05D 5/00
[52] U.S. Cl. ...................................... 427/421; 524/50; 521/65; 521/68; 106/121; 428/311.5
[58] Field of Search ...................... 524/50; 521/68, 65; 106/121; 427/421, 427; 252/62; 428/311.5

[56] References Cited

U.S. PATENT DOCUMENTS

| | | | |
|---|---|---|---|
| 3,730,763 | 5/1973 | Schlottmann et al. | 427/427 X |
| 3,922,462 | 11/1975 | Katz et al. | 428/290 |
| 4,247,581 | 1/1981 | Cobbs et al. | 427/421 |
| 4,254,177 | 3/1981 | Fulmer | 428/921 X |
| 4,277,568 | 7/1981 | Davison et al. | 521/68 |

FOREIGN PATENT DOCUMENTS

| | | | |
|---|---|---|---|
| 2450860 | 3/1979 | France . | |
| 52-65519 | 5/1977 | Japan | 252/62 |
| 54-12509 | 5/1979 | Japan | 521/68 |

OTHER PUBLICATIONS

Jet Sprayed Stone Fiber Insulation, Air–o–Therm Application Company, Inc., ©1981.
Technical Data Sheet TDS253, "Staramic Starches", A. E. Staley Manufacturing Co.
Advertisement: "This is Hi-Fibe", Hill Brothers Chemical Company.
Technical Bulletin: Hi Fibe 210 and 230, Hill Brothers Chemical Co., Aug. 1977, H115.
Technical Bulletin: Hi Fibe 250, 270, 290, Hill Brothers Chemical Co., Aug. 1977, H120.
Advertisement: Thermafiber ® Industrial Bulk Wool, Sweet's Catalog, 1977, vol. 7, Industrial Insulation.

*Primary Examiner*—Shrive P. Beck
*Attorney, Agent, or Firm*—Robert M. Didrick; Samuel Kurlandsky; Robert H. Robinson

[57] ABSTRACT

A composition comprising mineral wool and polyolefin fibers is adaptable for spraying onto a ceiling or wall or the like to form a textured acoustical coating.

The fibers are mixed with a binder, water and foaming agent to form a foamy composition. The composition is confined under pressure and released through a nozzle to form a steam. Compressed gas is introduced into the stream to atomize the composition.

5 Claims, No Drawings

SPRAYABLE ACOUSTICAL COMPOSITION

This application is a continuation-in-part, of application Ser. No. 337,546, filed Jan. 6, 1982 now abandoned.

This invention relates to a sprayable acoustical composition for application to ceilings, walls, columns, pillars, I-beams and other structural elements of buildings. It further relates to seamless, lightweight, fire-resistant, textured coatings for concrete, cement board, steel and other substrates in said structural elements.

Acoustical tiles and panels are the ubiquitous products in the field of architectural acoustics. Still, such products have drawbacks, too, such as the ubiquitous seams. Apparently seamless arrays of tiles presenting apparently random designs have been the goal of the acoustical tile industry for many years.

One way to achieve the seamless, patternless look is to spray a continuous coating on the structure but the achievement of all or most of the desirable qualities of sound absorbing compositions in a sprayable form has been a most difficult goal.

It is an object of this invention to provide a dry composition adapted for mixing with water to form a sprayable adherent composition which forms, upon drying, a sound absorbent coating.

It is another object of this invention to provide a sprayable coherent composition which is resistant to sagging while wet.

It is still another object of this invention to provide an attractively textured acoustical coating having a monolithic surface.

It is a further object of this invention to provide a fire-resistant acoustical coating.

It is still a further object of this invention to provide a mineral wool floc which is easily dispersed in water to form a sprayable acoustic material.

It is still a further object of this invention to provide a non-cementitious sprayable acoustical material which is readily removable from mixing and spraying equipment.

It is yet another object of this invention to provide a simple method for applying a monolithic acoustical coating on a structural element.

These and other objects which will become apparent from the following disclosure are achieved by a mineral wool based composition containing short fibers of a polyolefin. Polyethylene, polypropylene and copolymers of ethylene and propylene are representative of the polyolefins. The average length of the fibers may be from about 0.5 mm to about 5 mm (from about 0.02" to about 0.2") but a preferred range is from about 0.6 to about 3 mm, more preferably from about 0.6 to about 1.5 mm. The diameter of the fiber ranges from about 10 to about 50 microns (0.01 to 0.05 mm) but it is preferably within the range of from about 10 to about 40 microns. A pulp of polyethylene fibers in which the maximum length is about 2.5 mm and the diameter is from about 30 to about 40 microns is particularly preferred. Thus, the aspect ratio of length to diameter will be from about 10 to about 500 generally and for the preferred fibers it is from about 15 to about 150. The surface area of the fibers is from about 3 to about 15 square meters (about 32 to about 160 sq. ft.) per gram. The moisture content of the fibers in bulk is usually about 5% or less.

The polyolefin fibers constitute from about 1.5% to about 25% by weight of the floc of this invention, that is, the composition prepared for mixture with water to form a sprayable composition. Preferably, the amount is from about 2% to about 13%: particularly preferred is a composition comprising from about 3% to about 6% polyolefin fibers.

The floc also comprises, by weight, from about 25% to about 50% mineral wool, from about 2.0% to about 10% binder, from about 0.5% to about 7% foaming agent and, preferably, a thickener. An inert filler may also be incorporated in an amount of from about 20% to about 45% by weight. Examples of such a filler include calcium carbonate, gypsum, talcs, dolomite, clays, silica, mica, and perlite. A blend of talc and polyolefin fiber is especially useful in this invention. Though the particle size is critical only in relation to passage through the orifice of a spraying apparatus, a filler having a particle size distribution such that substantially all passes through a U.S. Standard Sieve No. 100 is particularly well adapted for use in this invention.

The depth of coverage on the substrate attained upon each pass of the spray gun is proportional to the percentage of mineral wool in the composition. Thus, a one-half inch thick layer of acoustical coating will require more passes of a given spray gun nozzle when the composition contains 25% mineral wool than when it contains 50%. It is preferable to use from about 30% to 50% of the wool; a particularly preferred floc contains about 40% or more wool.

The type of mineral wool is not critical. That which is used to form felted insulating blankets is satisfactory. A nodular wool is preferred. Shot formation is concomitant with fiber formation in the production of mineral wool but a wool containing a minimal amount of shot is preferred for the purposes of this invention. Large sizes or large amounts of shot should be avoided for esthetic purposes and to minimize wear and jamming of the spraying apparatus. A blowing wool such as that sold under the Thermafiber trademark by the United States Gypsum Company, one sold under the Red-Top trademark by the Canadian Gypsum Company, and a tile wool such as that sold by the former under the Red-Dot trademark are preferable.

A cold water soluble starch is a preferred binder in the compositions of this invention. The low viscosity, non-ionic starches are especially preferred. Examples of other useful binders include polyvinyl acetate, polyvinyl alcohol, mixtures thereof, modified soy protein, bone glue, and the like. Mixtures of a starch and another binder are also contemplated. A particularly preferred binder is a mixture of the soluble starch and polyvinyl alcohol, respectively constituting from about 2% to about 4% and from about 0.5% to about 1% of the total floc weight.

The foaming agent is usually a surfactant of the sodium sulfonate type but proteinaceous foaming agents are also contemplated as being useful for the purpose. A preferred range of foaming agent concentration is from about 1.5% and up; about 5% or more is especially preferred.

Thickeners, used singly or in combinations of two or more species, usually comprise from about 1 to about 6%, preferably from about 2 to about 4%, of the weight of the dry composition. The methylcellulose ethers, particularly hydroxypropyl methylcellulose, are examples of the thickeners used. Also, a hydroxyalkyl ether of a related polysaccharide, galactomannan gum, may be used alone or in combination with the methylcellulose type. A carboxymethyl cellulose further exemplifies the thickeners. The alkyl groups are lower alkyl.

Additives such as fungicides, rust inhibitors, and fire retardants may also be incorporated into the compositions of this invention. Examples of such are zinc dimethyldithiocarbamate, sodium nitrite, and a chlorinated wax or other halogenated organic compound in conjunction with antimony oxide. Fungicide levels of from about 0.3 to about 0.6%, by weight, are contemplated. The rust inhibitor may constitute from about 0.5 to about 2% of the dry weight. Fire retardants may amount to from about 0.5 to about 10% of the dry weight. Coloring agents such as dyes and pigments may also be included.

A sprayable composition is prepared by mixing from about 15 to 70 gallons of water (from about 55 to about 265 liters) with each 100 pounds (45 kilograms) of the floc. When the preferred polyethylene fiber pulp is used, the water demand of the floc is reduced so that only from about 15 to about 35 gallons of water are required for each 100 pounds of floc. Agitation of the mixture is effected with any suitable mixing apparatus for a period of time which is sufficient to build up a good head of foam. Generally, the volume of the foamed mixture is from about 1.4 to about 2.5 times the volume of the initial aqueous mixture. The foamed composition, ready for spraying, may contain from about 0.2% to about 11% polyolefin fibers, by weight. It is preferred, however, to use a foamy composition containing from about 0.5% to about 6% polyolefin fibers, by weight. For example, the desired amount of foam is produced by vigorously mixing 50 pounds of the floc with 20 gallons of water for about 10 to 20 minutes. A preferred floc, containing about 4% by weight polyolefin fibers, will thus produce a foamy composition containing about 0.9% polyolefin fibers.

Piston type or rotor-stator pumps may be used along with the usual texture spray guns to apply the foamed mixture. In general, a piston pump has a main cylinder and a surge cylinder, the latter of which is connected to a spray gun via a hose. A piston reciprocating within the main cylinder while the cylinder is immersed in the foamed mixture of this invention causes the mixture to be drawn into the cylinder and thence into the surge cylinder and the hose. A second or ram piston completes the voiding of the surge cylinder into the hose and spray gun. Compressed air is introduced into the mixture at the spray gun orifice to atomize the mixture as it is sprayed onto the substrate.

In a rotor-stator pump, a screw turning inside a shaft draws the foamy mixture from a hopper and drives it through the shaft and into a hose connecting the shaft to a spray gun. Again, compressed air atomizes the mixture at the spray nozzle.

The material feed is usually at a pressure of from about 15 p.s.i. to about 35 p.s.i. (about 100 to about 140 kPa) and the atomization pressure is from about 40 p.s.i. to about 70 p.s.i. (about 270 to about 480 kPa). A hopper gun, which depends upon gravity to force the mixture into a spray gun mounted on the hopper, may be used to spray the mixture at the higher atomization pressures.

Steel and other metal surfaces should be primed to promote instant adherence of the wet foamy mixture to the surface as the mixture is being applied. A rust-inhibitive primer is preferred for steel.

The acoustical, textured coating of this invention is the dried residue of the foamed mixture that has been sprayed onto the substrate. Usually, the coating is about $\frac{1}{2}$ inch thick but it may be within the range of from less than $\frac{1}{8}$ inch to more than $1\frac{1}{4}$ inches (0.3 to 3.2 cm). At a thickness of $\frac{1}{2}$ inch the coverage of the foamed mixture is about 0.8-2.0 square feet per pound (about 0.16 to 0.4 sq. meters per kg.) of the dry composition. The acoustical, textured coating weighs from about 10 to about 30 pounds per cubic foot (0.16 to 0.48 gram/cc); a one-half inch thick coating preferably weighs from about 0.5 to about 1 pound per square foot (about 2.5 to about 5 kg/m$^2$.)

The sound absorption capability of the textured coating of this invention compares favorably with that of acoustical tiles and panels. The noise reduction coefficient (NRC) of a one-half inch thick coating is usually about 0.5. Values as low as about 0.35 are considered suitable for some applications and values as high as 0.6 may be attained, as measured either by the ASTMC423-77 method or by use of a sound impedance tube (ASTM384) and conversion of the sound pressure differentials to statistical absorption coefficients by means of London's Curve [A. London, J.A.S.A., 263, (1950)].

The invention is illustrated more specifically by the following examples. The scope of the invention, however, is not restricted to the specific details of these examples.

EXAMPLE 1

A dry floc incorporating a polyethylene fiber sold under the trademarks Pulpex-E and Lextar by Hercules, Inc. is prepared by tumbling the bulk fiber with mineral wool and other components listed below in a Broughton mixer having two counter-rotating impellers. The fiber has a specific gravity of 0.96%, a melting point of 132° C., a moisture content less than 5%, a surface area of 6-10 m$^2$/g, a diameter of 10-20 microns, and the average length is stated as 0.6-1.2 mm. Identification of the other components is given below.

| Components | % by Weight |
|---|---|
| Polyethylene Fiber (grade A-H) | 12.0 |
| Nodular Mineral wool | 50.0 |
| Calcium Carbonate (Quincy #3) | 23.2 |
| Non-ionic Starch (Cold Water Soluble)* | 3.0 |
| Polyvinyl Alcohol (87-89 mol % Hydrolyzed Acetate) | 0.5 |
| Sodium Alkaryl Sulfonate** | 6.0 |
| Hydroxypropyl Methocellulose | 2.0 |
| Hydroxyalkyl Ether of Galactomannan Gum*** | 2.0 |
| Zinc Dimethyldithiocarbamate | 0.3 |
| Sodium Nitrite | 1.0 |

*Staramic 620 from A. E. Staley
**Calsoft F-90 from Pilot Chemical
***Aquathix from Tenneco Chemicals The floc is then mixed with water at a ratio of 39.6 gallons per 100 pounds of floc in a Hobart bakery-type mixer for about three minutes. The foamed mixture is sprayed onto seven mortar patties to various thicknesses and dried for twenty one days. The uncoated patties are one-half inch thick and three and seven/eighths inches in diameter.

The sound absorbance of the coated patties was tested at four frequencies (250 Hz, 500 Hz, 1000 Hz, and 2000 Hz) by the ASTM 384 method, using a sound impedance tube. The statistical absorption coefficient was determined from a plot of the average difference between the maximum and minimum sound pressures at each frequency along London's curve. The results are given in Table I.

TABLE I

| Sound Absorption | Coating Thickness (inches) | | | | | | |
|---|---|---|---|---|---|---|---|
| | 1/4 | 3/8 | 1/2 | 5/8 | 3/4 | 1 | 1 1/4 |
| Sound Pressure Differential (Average) | 36.0 | 27.25 | 26.5 | 22.0 | 22.0 | 22.8 | 17.13 |
| Sound Absorption Coefficient | 0.15 | 0.38 | 0.41 | 0.53 | 0.53 | 0.51 | 0.68 |

EXAMPLE 2

A floc like that of Example 1 is prepared except for the following variations: calcium carbonate—27.2%, guar gum instead of the galactomannan gum ether, sodium alkaryl sulfonate (Ultra Wet DS)—3.0%, sodium nitrite—0%. Sufficient water is added to the floc to yield a slurry occupying about twice the volume of the floc. The slurry is agitated vigorously to generate foam and again double the volume.

The foamed mixture is sprayed onto 80 sq. ft. (7.43 m$^2$) of 1.5 inch (38 mm) thick concrete slabs and the slabs are laid on a laboratory floor and fitted tightly together. The thickness of the sprayed-on coating is 0.5 inch (12.7 mm). The Reverberation Room Method (ANSI/ASTM C423-77) is used to determine the sound absorption coefficients of the coated array of slabs. The results of the test are as follows:

| 1/3 Octave Band Center Frequency (Hz) | Absorption Coefficient |
|---|---|
| 125 | 0.05 |
| 250 | 0.16 |
| 500 | 0.38 |
| 1000 | 0.69 |
| 2000 | 0.85 |
| 4000 | 0.79 |

The average of the coefficients at 250 Hz, 500 Hz, 1000 Hz, and 2000 Hz, expressed to the nearest integral multiple of 0.05, is the NRC which, thus, is 0.50.

EXAMPLE 3

A dry floc incorporating the D-H grade of the Pulpex-E polyethylene fiber pulp was prepared by agitating the pulp with mineral wool and other components, as listed below, in a 30 gallon drum with an impeller driven by a 1/2 inch drill motor for 3 minutes. The maximum length of the fibers was 2.5 mm (about 0.1 inch) and the fiber diameter ranged from 30 to 40 microns. The surface area of the pulp was in the range of 10–15 m$^2$/g.

The floc consisted of:

| Components | % by Weight |
|---|---|
| Polyethylene Fiber | 4.0 |
| Nodular Mineral Wool | 50.0 |
| Calcium Carbonate (Quincy #3) | 37.6 |
| Non-ionic Starch (Staramic 620) | 3.0 |
| Sodium Alkaryl Sulfonate | 3.0 |
| Hydroxyalkyl Ether of Galactomannan Gum | 0.3 |
| Hydroxypropyl Methylcellulose* | 0.8 |
| Zinc Dimethyldithiocarbamate | 0.3 |
| Sodium Nitrite | 1.0 |

*Methocel F4M

Water was then mixed with the floc at a ratio of about 18.9 gallons per 100 pounds in the same drum with the same mixer for 4 minutes. After about 15 minutes, the wet mix was agitated again for 3 minutes. A portion of the foamy mixture was sprayed onto four pieces of wallboard to form coatings which when dry were 1/4", 1/2", 3/4" and 1" thick. The coverages obtained were 1.71, 0.91, 0.63 and 0.47 sq. ft/lbs., respectively.

Another portion of the foamy mixture was sprayed onto a series of cement patties for the measurement of sound absorbance by the sound impedance tube method. A one-half coating had a sound absorption coefficient of 0.59.

A third portion of the mixture was sprayed onto a 4"×40" piece of wallboard to form a one-half inch thick coating when dry to obtain a test sample for a small scale test under the conditions of the ASTM E-84 test procedure for flame spread. The rating was 13.92 which put the coating in Class A.

EXAMPLE 4

Another batch of the foamy mixture was prepared according to the general procedure for Example 3 and was sprayed onto a ceiling. No sagging of the coating was observed.

What is claimed is:

1. A method for forming a monolithic, acoustical, textured surface comprising mixing mineral wool, polyolefin fibers, a binder selected from the class consisting of starch, polyvinyl acetate, polyvinyl alcohol and mixtures thereof, a foaming agent and water to form a foamy composition, confining said composition under super-atmospheric pressure, releasing it through a nozzle to form a stream, introducing a compressed gas into said stream to atomize the composition, and directing said atomized composition against a substrate.

2. The method of claim 1 characterized further by selecting polyolefin fibers having an average length of from about 0.5 mm to about 5 mm.

3. The method of claim 1 wherein the amount of polyolefin fibers is from about 0.2% to about 11%, by weight, of the foamy composition.

4. The method of claim 3 wherein the mixing is sufficient to form a foamed composition having a volume from about 1.4 to about 2.5 times the volume of the unfoamed composition.

5. The method of claim 1 wherein the foamy mixture is confined at a pressure of from about 15 p.s.i. to about 35 p.s.i. and the atomization pressure at the nozzle is from about 40 p.s.i. to about 70 p.s.i.

* * * * *